(12) United States Patent
Hermey et al.

(10) Patent No.: US 12,716,469 B2
(45) Date of Patent: Aug. 25, 2026

(54) LINE GUIDE APPARATUS FOR SUSPENDED APPLICATIONS, IN PARTICULAR DRILLING RIGS, DRILLING APPARATUS OR THE LIKE

(71) Applicant: IGUS GMBH, Cologne (DE)

(72) Inventors: Andreas Hermey, Hennef (DE); Philip Howold, Frechen (DE); Christoph Schmidt, Eitorf (DE); Tim Schneebeck, Duisburg (DE); Thilo Konrad Schultes, Cologne (DE)

(73) Assignee: IGUS GMBH, Cologne (DE)

( * ) Notice: Subject to any disclaimer, the term of this patent is extended or adjusted under 35 U.S.C. 154(b) by 733 days.

(21) Appl. No.: 18/040,387

(22) PCT Filed: Aug. 3, 2021

(86) PCT No.: PCT/EP2021/071707
§ 371 (c)(1),
(2) Date: Feb. 2, 2023

(87) PCT Pub. No.: WO2022/029148
PCT Pub. Date: Feb. 10, 2022

(65) Prior Publication Data
US 2025/0361923 A1 Nov. 27, 2025

(30) Foreign Application Priority Data
Aug. 3, 2020 (DE) .................. 20 2020 104 4822.6

(51) Int. Cl.
*F16G 13/16* (2006.01)

(52) U.S. Cl.
CPC .................................... *F16G 13/16* (2013.01)

(58) Field of Classification Search
CPC .... F16G 13/16; H02G 3/0475; H02G 3/0462; H02G 11/00; H02G 11/003; F16L 3/015
See application file for complete search history.

(56) References Cited

U.S. PATENT DOCUMENTS 7,278,253 B2 10/2007 Wehler et al.
9,435,464 B2 * 9/2016 Steeger ................. F16L 3/1075
(Continued)

FOREIGN PATENT DOCUMENTS

DE 8703229 12/1987
DE 4428680 9/1995
(Continued)

OTHER PUBLICATIONS

Translation of EP-2226164.*
(Continued)

*Primary Examiner* — Bobby Yeonjin Kim
(74) *Attorney, Agent, or Firm* — Secant IP, PLLC

(57) ABSTRACT

Line guide apparatuses for guiding a plurality of lines for suspended applications such as for example in a drilling rig. The line guide apparatus has a flexible carrying strand of high tensile strength which extends over the length of the line guide apparatus. Guide bodies are arranged in the longitudinal direction of the carrying strand, adjacent guide bodies being spatially deflectable relative to one another. At least some guide bodies in each case have a central part with a fastening device for fastening to the carrying strand, and an outer part with at least one circumferential element, which delimits a receiving region for lines. At least three radial bars are provided on the central part and hold the outer part. At least one spacer body is provided on the carrying strand between in each case two guide bodies, the spacer body specifying a spacing between the central parts of the guide bodies. The spacer body may be configured with an external diameter which is reduced relative to the guide bodies and/or in such a way that the outer parts of the two guide bodies may rest against one another in the fully deflected relative position.

23 Claims, 6 Drawing Sheets

(56) References Cited

U.S. PATENT DOCUMENTS

| | | | |
|---|---|---|---|
| 2006/0258229 | A1 | 11/2006 | Harada et al. |
| 2021/0262587 | A1 | 8/2021 | Barten et al. |

FOREIGN PATENT DOCUMENTS

| | | | | |
|---|---|---|---|---|
| DE | 29607172 | | 6/1996 | |
| DE | 29703680 | | 5/1997 | |
| DE | 19716695 | | 12/1998 | |
| DE | 20305677 | | 7/2003 | |
| DE | 102010032920 | | 2/2012 | |
| DE | 102010032921 | | 4/2012 | |
| DE | 202012001760 | | 5/2012 | |
| DE | 202013101460 | | 6/2013 | |
| DE | 202018103418 | U1 * | 12/2018 | ............ F16G 13/16 |
| DE | 202018103418 | | 1/2019 | |
| DE | 202020100699 | | 5/2020 | |
| EP | 2226164 | | 9/2010 | |
| EP | 2226164 | A1 * | 9/2010 | ............. B25J 19/00 |
| EP | 3641084 | | 2/2022 | |
| FR | 1365129 | | 6/1964 | |
| JP | 2019-88072 | | 6/2019 | |
| WO | 98/52265 | | 11/1998 | |
| WO | 2013/124370 | | 8/2013 | |
| WO | WO-2013124370 | A2 * | 8/2013 | ........... H02G 3/0475 |
| WO | 2017/195148 | | 11/2017 | |
| WO | 2019/234090 | | 12/2019 | |

OTHER PUBLICATIONS

Translation of WO-2013124370.*

Translation of DE-202018103418.*

English translation of the International Search Report from corresponding PCT Appln. No. PCT/EP2021/071707, dated Feb. 16, 2022.

English translation of the International Preliminary Report on Patentability from corresponding PCT Appln. No. PCT/EP2021/071707, dated Nov. 10, 2022.

Office Action from related Japanese Appln. 2023-504661, dated Sep. 3, 2025. English translation attached.

* cited by examiner

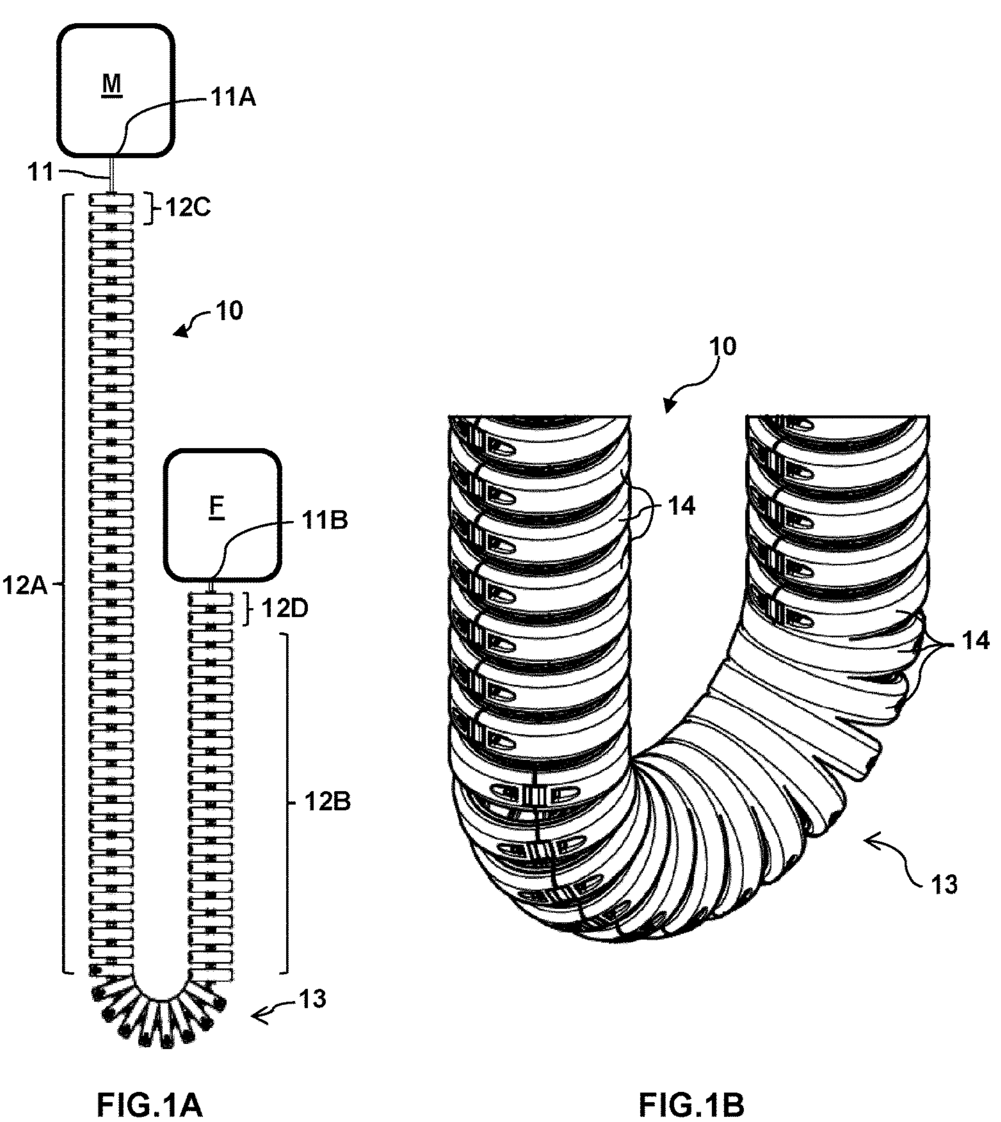
FIG.1A
FIG.1B
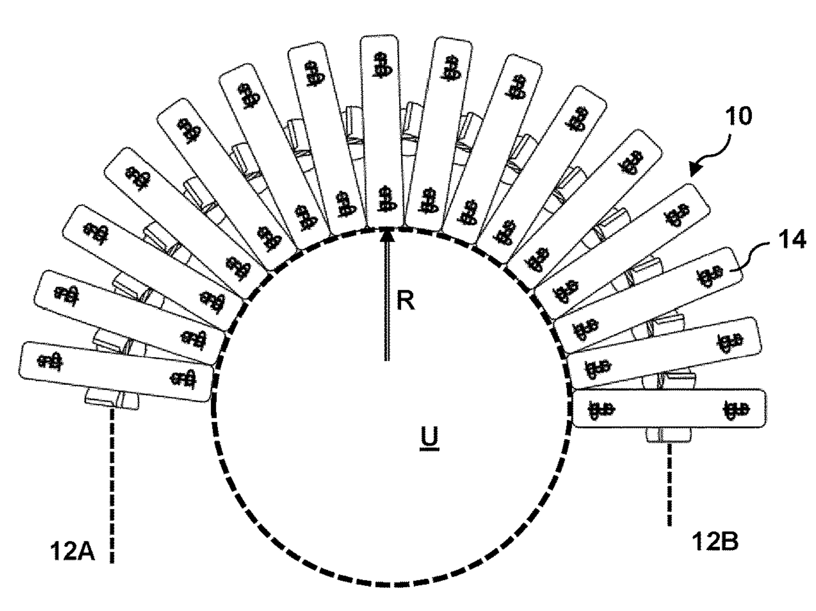
FIG.1C

LINE GUIDE APPARATUS FOR SUSPENDED APPLICATIONS, IN PARTICULAR DRILLING RIGS, DRILLING APPARATUS OR THE LIKE

FIELD

The invention relates in general to a device for dynamically guiding a plurality of supply lines such as for example cables, hoses or the like, hereinafter referred to as a line guide apparatus, in particular for particularly high tensile forces such as for example in suspended applications in which the line guide apparatus is intended to carry a long, freely suspended portion, such as for example in a drilling rig or the like, for example when the line guide apparatus is arranged with two suspended portions and a loop therebetween.

The invention relates specifically to a line guide apparatus for guiding a plurality of lines, comprising a flexible carrying strand of high tensile strength, in particular a cable or a chain, which extends over the length of the line guide apparatus, and a number of guide bodies arranged on the carrying strand in the longitudinal direction thereof, adjacent guide bodies being spatially deflectable relative to one another. At least some guide bodies here in each case have a central part or central member with a fastening device for fastening the guide body to the carrying strand, and an outer part with at least one circumferential element, which outwardly delimits a receiving region for lines and thus holds one or more of the lines guided on the carrying strand.

BACKGROUND

Such a line guide apparatus of the above type with a carrying strand is already known from WO 2019/243377 A1. A comparable line guide apparatus was, moreover, proposed in WO 2019/234090 A1.

Thanks to the central carrying strand, this line guide apparatus of the above type may absorb very high tensile forces, without these having to be transmitted via the individual guide bodies. In this way, applications with comparatively long freely suspended portions, for example distinctly <10 m, may inter alia be achieved. Line guide apparatuses of the above type may therefore be used in particular in drilling rigs (offshore/onshore), or in deep mining for example on a drilling apparatus, and also for example for onshore power supply for ships.

It has however become evident that the known modes of construction, for example according to WO 2019/243377 A1 or WO 2019/234090 A1, exhibit only limited robustness with regard to radially inwardly directed forces, which arise for example if the line guide apparatus is to be deflected by way of a deflection roller or wound or unwound using a drum. In this case, the guide bodies may become deformed in the radial direction for example by high weight force resulting from a long, freely suspended portion, which may lead to undesired transverse loading of the lines or indeed to permanent deformation.

SUMMARY

In the light of the above prior art, a first object of the invention consists in further developing a line guide apparatus of the above type in such a way that the guide bodies may withstand higher transverse forces, in particular radially inwardly directed transverse forces.

A further, independent second object consists in enabling a reduced predefined bending radius or radius of curvature for the deflection loop or deflection region in the case of line guide apparatuses of the above type, in particular those with relatively large diameters.

First Aspect

This first object is achieved according to a first aspect by a line guide apparatus or by a guide body configured therefor.

This first object may be achieved merely by providing, for guide bodies susceptible to transverse loading, at least three radial bars on the central part or central member which hold or carry the outer part and support it radially. In comparison with the above-mentioned, previously known solutions, in which just two radial bars are provided to maximize receiving space, higher inwardly directed radial forces may be absorbed thereby even in unsupported regions between the bars without deformation of the outer part, in particular of the circumferential element(s), occurring. As a result of the higher number of radial bars, radial forces may be better intercepted and diverted onto the middle central part.

A higher number of radial bars additionally allows a structured internal subdivision of the receiving space for the lines, such that the latter have a defined course and are exposed to less wear due to relative motion in relation to one another. A subdivision with at least three separate chambers, i.e. which has at least three bars, is also advantageous in this respect.

Preferably at least four radial bars, which carry or support the outer part, are accordingly provided on the central part.

Depending on the desired free diameter of the receiving region and the expected forces, five or more radial bars may also be provided on the central part, in order to carry or support the outer part and/or to achieve a better internal subdivision.

In this respect, each bar in each case carries and supports a region of a circumferential element, in particular if precisely one encircling circumferential element is provided, or, depending on the number of provided circumferential elements, optionally also two separate circumferential elements at the end.

The radial bars act like spokes and have a main extent in the radial direction relative to the center axis along which the carrying strand is guided by the central part, i.e. they also lie radially relative to the longitudinal direction of the carrying strand. The radial bars are preferably arranged uniformly distributed in the circumferential direction around this center axis, i.e. with a substantially identical angular dimension or radian measure in between every two circumferentially adjacent radial bars.

In a preferred, simple-to-maintain configuration, the at least one circumferential element is connected releasably or removably with at least one of the radial bars. In this way, individual lines can be quickly replaced if need be. For a connection which can be undone without using tools, it may preferably have an end region, in particular an end region with a latching element. Particularly preferably, back-engaging latching may for example be provided between the end region of the circumferential element and the corresponding bar. Latching back-engagement may proceed in the radial, axial and/or circumferential direction.

In one embodiment, provision is made for at least one radial bar to comprise a radial portion and at least one projection protruding substantially in the circumferential direction for connection with the at least one circumferential element. Provision may preferably be made for the at least one projection to have a latching element for latching engagement with the circumferential element and/or to be embodied in one piece with the radial portion.

Provision may advantageously be made for the circumferential element to be supported, when fitted, with the releasable end region in the circumferential direction on the corresponding radial bar, in order to achieve a more favorable introduction of force or more robust, impact-resistant construction.

The central part forms an axial passage opening for the carrying strand and is preferably of multipart embodiment. In this case, the central part may have at least two or precisely two components, in particular clamping shells, for fastening to the carrying strand. A multipart construction is advantageous for form- and/or force-locking fastening to the carrying strand, which may be embodied for example as a cable, in particular a plastics cable, or indeed as a link chain, for example comprising steel links. The individual components here delimit the passage opening and may in each case rest or act form- or force-lockingly on the carrying strand.

The fastening device of the central part for fastening the guide body to the carrying strand in particular enables fixed, i.e. axially stationary, fastening of the guide body in question in the longitudinal direction of the carrying strand.

The carrying strand carries a substantial part of the weight and, similarly to the internal core of a cable, relieves the lines of tensile force loads. The carrying strand is so flexible that it does not adversely affect deflection of the guide bodies relative to one another. The guide bodies hold the lines in the receiving region, i.e. relative to the central part, and thus fixedly at least in the radial direction relative to the carrying strand.

In the case of multipart construction of the central region or central part, it is advantageous, for the purposes of a design which is captive and/or secured against falling, if at least two radial bars are mounted on, in particular are produced or formed in one piece with, at least one component, in particular one of the clamping shells.

Preferably precisely two clamping shells may in each case have at least two, or indeed three or more depending on the number of bars, radial bars provided in one piece therewith. The bars are thus quicker and easier to fit and at the same time captive.

It is also feasible to configure the central part in such a way that it consists of more than two main component parts. In this case, a number of components, in particular clamping shells, corresponding to the number of radial bars may in particular be provided. Each bar is then in each case preferably associated with one component and produced or formed in one piece therewith.

In one preferred embodiment, the flexible carrying strand is embodied as a cable (i.e. not as a link chain). It is advantageous, in particular in combination with a cable as carrying strand, for the fastening device of the central part to be embodied in the manner of an articulated clamping shell or as a screw clamping device. To this end, it may comprise a joint and a clamping screw, in order to fasten or axially secure the at least two or precisely two components, in particular clamping shells, to the carrying strand or cable, with generation of a clamping force, and in this way to secure the guide body in question to the cable in the longitudinal direction.

In one preferred embodiment, a number of circumferential elements corresponding to the number of radial bars is provided, the circumferential elements being embodied as arcuate segments and/or fastened releasably to in each case two radial bars. Preferably at least three circumferential elements, particularly preferably at least four separate circumferential elements, are thus provided. All the circumferential elements may in particular be embodied as standard parts, for example as arc segments approximately in the form of a quarter circle or similar to quarter shells or the like.

Provision may be made for each radial bar to comprise a radially extending portion and at least one circumferentially extending projection, in particular embodied in one piece with the radially extending portion, for releasable connection with in each case one circumferential element. In this respect, the projection may have a latching element for latching engagement with the circumferential element.

The outer part with the one or more circumferential elements preferably forms a circumferentially closed, continuous ring when the guide body is closed and fitted ready for operation. The ring may optionally be supplemented or passed through by radial end regions of the bars, but the outer part or the circumferential elements otherwise completely surround the central part. This enables a more favorable introduction of radial forces via multiple bars and reduces undesired deformation of the outer part.

To open the guide body to insert and remove lines, for example during production or maintenance, provision is preferably made for each circumferential element to have a first end which is connected swivelably by an articulated joint to a radial bar.

Furthermore, each circumferential element may have a second end, which is latchable by a snap-fit connection to a further, adjacent radial bar, and so may be released from this bar for the purpose of swiveling open if need be.

Fastening the ends of each circumferential element on both sides, which element is preferably more readily releasable on one side, considerably simplifies fitting and handling. The circumferential elements may thus be opened if need be, which is particularly advantageous from the point of view of handling in particular with a relatively high number of circumferential elements or radial bars, for example if just one line has to be renewed.

For improved introduction of force, the circumferential elements in each case have circumferentially acting, substantially radially positioned support faces, which are supported on the radial bars. In the case of a segment-like structure with a number of circumferential elements identical to the number of bars, a radial transverse force may thus be distributed all round to a plurality of or all the radial bars.

In one embodiment, provision is made for the first end of the circumferential element to have a joint region and to form two support faces in the axial direction on both sides next to the joint region, by way of which support faces the first end is supportable on the radial bar in the circumferential direction. The axial spacing between the two support faces ensures better securing against undesired movement or tilting in the axial direction.

Furthermore, the second end of the circumferential element may also have one or optionally a plurality of support faces, by way of which the second end is supportable in the circumferential direction on the radial bar, optionally also by two axially spaced faces.

In addition or as an alternative, provision is made for the second end of the circumferential element to form a latching receptacle, which is latchable with a latching projection on the further radial bar, the latching receptacle and latching projection extending in particular substantially in the tangential direction and/or being releasable by leverage or torsion around a tangential direction. In this way, undesired release of the latched connection by radial interference forces may be avoided since the latched connection is not intended to be undone by force in the radial direction.

The radial bar may furthermore preferably have a securing means in the tangential direction which interacts with the latching receptacle of the circumferential element.

To open up access to the receiving space for lines, one end of the circumferential element is preferably in each case mounted swivelably on a radial bar. This may for example be achieved using a joint of the hinge type or the like. Alternatively, however, the two ends of the circumferential element may also be fastened to bars in a different way, for example by a snap-fit connection, which optionally further simplifies the introduction of force.

In one preferred embodiment, the first end of the circumferential element has a joint region with a swivel pin which is connected swivelably with a swivel hook on the radial bar. In this respect, it is particularly preferable, in order to secure against loss or against unintended release of the circumferential element, for the first end of the circumferential element to form an unlocking face, which, in cooperation with the bar, enables release of the swivel pin from the swivel hook only over a limited angular range in the case of an undone snap-fit connection at the second end. Such an unlocking face may for example be provided by a set-back region between the above-stated support face on the one hand and a further stop face as angle delimitation for the maximally swiveled-open position.

So that the number of circumferentially accessible regions for fitting or maintenance purposes is reduced, or separate access does not arise for each circumferential element, it is advantageous if at least one first radial bar is connected articulatedly in each case on both sides with in each case a first end of two circumferential elements, and for this purpose preferably has two swivel receptacles each for one circumferential element. In this way, for example when using four bars on in each case just two diametrically opposite sides, it is possible to provide access for inserting or removing lines, i.e. the circumferential elements are to be opened in pairs, like a window with two sashes, in the same circumferential region or from the same side.

It is accordingly likewise advantageous if at least one second radial bar is latchable in each case on both sides by a snap-fit connection with in each case a second end of two circumferential elements, and to this end preferably has two latching projections each for one circumferential element.

Thus, two circumferential elements may be mounted swivelably with both first ends on the same bar or be closed with both second ends on a further bar.

The outer part may optionally also consist of just one substantially completely encircling circumferential element.

Preferably, however, at least two circumferential elements, in particular at least three circumferential elements are included, which are preferably held releasably, movably and/or swivelably on the central part.

In one preferred further development, the outer part further comprises, in addition to the circumferential element(s), a circumferential, annular, resilient buffer or protector for shock-absorption. The buffer surrounds the circumferential elements externally and is preferably held on the latter in the axial direction. To this end, the circumferential element(s) may have on the outside, and the buffer on the inside, a shape with an annular recess and engaging projection, which effects holding of the buffer in the axial direction. The buffer may at the same time captively secure the circumferential elements.

Preferably, one of at least three radial bars, in particular one of the above-stated second radial bars, i.e. a bar to which two circumferential elements is latchable, has a radially protruding securing region for example with a securing opening. Two ends of the annular resilient buffer may, for example, then be fastened captively thereto by way of a securing screw.

Preferably, the circumferential elements are held independently of the buffer in a closed position fastenably, in particular latchably or swivelably, on one or more bars. Fitting and maintenance are simplified if the circumferential elements remain held in the closed position even after removal of the buffer, i.e. have to be opened if need be.

In one preferred embodiment, each of the radial bars is in each case embodied in one piece.

Each circumferential element is preferably embodied at least between two circumferentially successive bars as a continuous arc segment and, depending on the number of circumferential elements, preferably held at the end on these bars.

It is mechanically advantageous with regard to force absorption if the radial bars are evenly distributed circumferentially around the center axis and/or each circumferential element is embodied in the form of an arc of a circle and has a radian measure in the circumferential direction of ≤120°, in particular ≤90°.

The proposed construction is suitable in particular for lines with a high weight per unit length and/or large line diameters, i.e. for correspondingly dimensioned guide bodies in which the internal diameter of the outer part is ≥300 mm, in particular ≥350 mm.

The invention further relates to a guide body in itself (per se), which is configured specifically for a line guide apparatus according to one of the above exemplary embodiments. According to the invention, the guide body has at the central part at least three radial bars, in particular at least four radial bars, in order to hold the outer part. The guide body may moreover advantageously have the above-stated features.

The proposed line guide apparatus is suitable inter alia for use in an arrangement for supplying lines, for example in a drilling rig or for onshore power supply for ships, in which a deflection roller and/or a drum is provided, the line guide apparatus being deflected over the deflection roller or wound and unwound by way of the drum.

The invention affords particular advantages where relatively heavy line bundles have to be arranged suspended substantially vertically over a considerable length. The present invention is therefore particularly suitable for use in a land or onshore or sea or offshore drilling rig, in particular as a service loop, but is not restricted to these areas. Further applications of offshore operations are for example supply cables (umbilicals) between platform and supply ship or onshore power supply for ships. The solution of the invention is also particularly well suited for land-based applications, in particular suspended applications, for example in drilling or deep drilling systems or in mining.

The carrying strand can in particular be a carrying cable which has high tensile strength, for example of high-strength plastics. In the present case, tensile strength means that the carrying strand or the carrying cable has sufficient tensile strength to carry the total weight of the line guide apparatus including all lines, i.e. a notional end weight which corresponds to the total weight of the line guide apparatus with all lines. The required static load-carrying capability of the carrying strand is dependent on the application involved, but should typically be >>1000 kg.

A wire cable with individual cable wires may also be considered as the carrying strand, preferably with a nominal strength of the wire material of >900 N/$mm^2$. In addition or as an alternative to cable wires of plastics, cable wires of steel can also be considered, possibly with a core of plastics. The carrying strand or the carrying cable should be as inextensible as possible. As an alternative to a carrying cable, it is for example also possible to use a link chain, for example comprising steel links, as the carrying strand.

Preferably, however, a carrying cable of high-strength plastics is used in conjunction with guide bodies which are at least predominantly made from plastics. In that way, it is possible to achieve a comparatively low weight per unit length of <40 kg/m for the line guide apparatus per se (without guided lines) even with a comparatively high receiving capacity in respect of the guide bodies or a large internal diameter, for example >>200 mm, and a corresponding load-carrying force. Noise emissions are also markedly lower in comparison with link chains.

For intended applications, in particular in drilling rigs, the carrying strand is preferably of a length of at least 5 m, in particular at least 10 m. In this case, the carrying strand is preferably completely continuous and has a higher tearing strength and tensile strength than the guided lines. The carrying strand or the carrying cable preferably extends over the desired total length of the line guide apparatus and projects at the end beyond the guide bodies in order to facilitate weight-carrying fastening of the carrying strand or carrying cable.

Second Aspect

According to a further independent aspect of the invention, a line guide apparatus is proposed to achieve the above-stated second object. In the second aspect, the number of radial bars is not of fundamental importance, but advantageous features of both aspects can also be combined with one another.

The second aspect relates to a line guide apparatus for guiding a plurality of lines, such as cables, hoses, or the like, which has a flexible carrying strand of high tensile strength, which may extend over the length of the line guide apparatus, and may, to this end, consist of one continuous or a plurality of connected guide bodies. A number of bodies are arranged in the longitudinal direction on the carrying strand, adjacent bodies being spatially deflectable relative to one another. At least some of these bodies take the form of guide bodies for lines and for this purpose in each case have a central part with fastening device for fastening to the carrying strand, and an outer part with at least one circumferential element, which outwardly delimits a receiving region for lines.

According to the independent second aspect of the invention, it is proposed that, at least in a longitudinal portion of the line guide apparatus or over the entire length thereof, at least one spacer body be provided on the carrying strand between in each case two guide bodies, the spacer body specifying a spacing between the central parts of the in each case two guide bodies. The spacer body is configured differently from the guide bodies, and may to this end for example be embodied without an outer part, but with a central part configured functionally similarly to the guide bodies.

A core function of the spacer body consists in specifying a spacing between two guide bodies along the carrying strand, but without substantially impairing the spatial deflectability thereof. The spacer body may to this end in particular be configured with an external diameter which is reduced relative to the guide bodies and/or in such a way that the outer parts of the two guide bodies may rest against one another in the fully deflected relative position, in particular strike directly against one another.

Suitably configured spacer bodies, in particular with an external diameter which is markedly reduced relative to the outer part of the guide bodies, make it simply possible to achieve a markedly larger relative swivel angle between the in each case two spaced guide bodies or greater deflection relative to the straight extended position, i.e. a noticeably reduced radius of curvature or bending radius in the deflection region. This is particularly advantageous with line guide apparatuses of large diameter, i.e. for applications with many lines and/or lines of large diameter, for example in the case of a deep drilling rig.

The spacer bodies may furthermore stiffen the carrying strand, such that compared to the simpler measure of fastening guide bodies to the carrying cable with a relatively large distance between them, undesired kinking can be prevented and the lines thus protected. This is advantageous in particular when using a flexible cable as carrying strand.

In one embodiment, in the longitudinal portion, when viewed along the longitudinal direction of the carrying strand, every $n^{th}$ body, with $n \geq 2$, is embodied as a guide body. For example, only every second or every third body may be provided as an actual guide body for line guidance. Accordingly or as an alternative, exactly one spacer body may be provided between every two guide bodies.

In one particularly simple structure, at least in the longitudinal portion or over the entire length of the line guide apparatus, guide bodies may be provided alternatingly with spacer bodies.

One additional advantage of the spacer bodies is that they save weight, such that the total weight of the line guide apparatus can be reduced by providing spacer bodies.

The central part radially inwardly delimits the receiving region for lines. The spacer bodies are preferably embodied with a compact outer contour in cross-section perpendicular to the longitudinal direction, lying substantially within the radial inner boundary of a receiving region for lines defined by the central part of the guide bodies. Thus, the contour of the spacer bodies preferably does not protrude substantially radially into the receiving region, such that the receiving region remains free for lines in the axial direction.

In a preferred embodiment, similar to the preferred configuration of the guide bodies according to the first aspect, provision may be made for each spacer body to connect two adjacent bodies in spatially deflectable, in particular articulated manner. In this case, each spacer body may preferably have two joint regions at opposite ends suitable for articulated connection with guide bodies. These may be suitably or appropriately embodied for cooperation with corresponding joint regions of the central parts of the guide bodies. Preferably, the joint regions of the spacer bodies and/or guide bodies may in particular be connected axially releasably together, and preferably in such a way that tensile forces are not absorbed via the spacer bodies and/or guide bodies, but predominantly or exclusively by the carrying strand.

The spacer bodies are preferably dimensioned in such a way, in particular in the axial direction, that a constantly uniform chain pitch is achieved in the longitudinal portion. Chain pitch here denotes, for example, the axial distance between two successive joint centers of the articulated connection of the bodies, and is understood here to mean the same as the definition for link chains.

It is fundamentally advantageous for the spacer bodies to be of maximally compact construction in the radial direction, i.e. the maximum external diameter of the spacer bodies preferably amounts to markedly less, in particular less than 33% of the external diameter of the outer parts of the guide bodies, in particular ≤30% of the external diameter of the outer parts.

The outer parts form a circular ring-shaped outer contour of robust construction. Application of the second aspect is advantageous in particular for the implementation of large diameters. Provision may accordingly be made for the external diameter of the outer parts of the guide bodies to amount to at least 2.5 times the chain pitch, in particular ≥2.8 times the chain pitch. In addition or as an alternative, the external diameter of the outer parts may amount to for example >300 mm or more. A reduction in bending radius may, however, also offer advantages in the case of relatively small diameters.

In one embodiment, each spacer body may form an axial passage opening for the carrying strand and be of multipart embodiment, in particular with at least two components for form- and/or force-locking fastening to the carrying strand. This is advantageous in particular for production and fitting, but is not absolutely essential. Particularly simple spacer bodies may take the form, for example, of one-piece tubular spacer sleeves, but these have optionally to be threaded onto the carrying strand during production and maintenance.

On the basis of a preferred configuration of the guide bodies, each spacer body is preferably embodied as a type of articulated clamping shell. To this end, the spacer body may comprise a clamping joint and a clamping screw, for example to fasten the two shell-type components on the carrying strand with generation of a clamping force, in particular also in a manner which is resistant to displacement in the axial direction.

In one simple construction, each spacer body may consist substantially of two elongate half shell-like components. In this case, the components may in particular be embodied with an interfering edge-free outer contour and/or without radially protruding bars.

The guide bodies may per se correspond, in the second aspect, to a construction according to the teaching of WO 2019/243377 A1. According to a preferred configuration, apart from the number of bars, they may also be configured according to the first aspect or the subsequent exemplary embodiments thereof.

Individual features, in particular of the independent first and second aspects, are understood in the present context in each case as being of significance to the invention and also as combinable.

BRIEF DESCRIPTION OF THE DRAWINGS

Further details, features and advantages of the invention will be apparent from the detailed description hereinafter of preferred embodiments by way of example with reference to the accompanying drawings. In the drawings:

FIGS. 1A-1C: show a first exemplary embodiment of a line guide apparatus in a suspended arrangement for supplying a vertically movable consumer in side view (FIG. 1A) and in a perspective enlarged view of the lower region or the deflection loop (FIG. 1B); together with a deflection region with which the line guide apparatus is deflected around a deflection roller indicated only schematically (FIG. 1C);

DETAILED DESCRIPTION

Figure 2A:
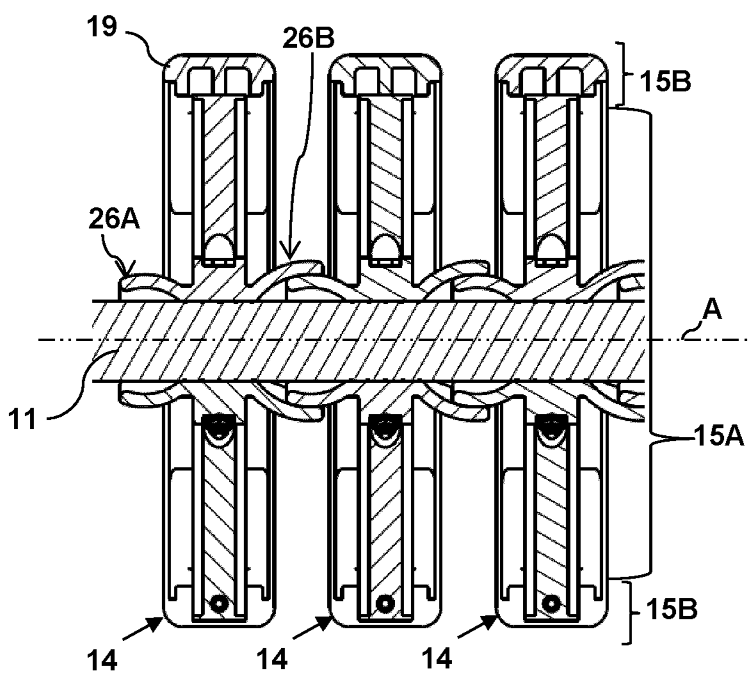
FIGS. 2A-2B: show an axial section/longitudinal section (FIG. 2A) through a number of guide bodies in the longitudinal direction and a radial section/cross-section (FIG. 2B) of one guide body according to a first exemplary embodiment of a line guide apparatus according to FIGS. 1A-1B.

FIGS. 1A-1B show an example of a line guide apparatus 10 in a suspended arrangement with a first vertical longitudinal portion 12A, which has a first end 12C, and a second vertical longitudinal portion 12B with a second end 12D. The first end 12C is connected with a machine part M, for example a drilling head or the like, which, in this example, travels vertically up and down. The second longitudinal portion 12B is in turn fixed with its end 12D to a frame structure or stationary machine part F. In FIG. 1A, a loop 13 forms a freely suspended deflection region which connects the two substantially vertically suspended longitudinal portions 12A, 12B.

The line guide apparatus 10 has a flexible carrying cable 11 of high-strength plastics fibers, for example of high-modulus polyethylene or high-modulus polyamide, which, as the carrying strand, carries the weight load. To this end, the end regions 11A, 11B, which are free or protrude on both sides, of the carrying cable 11 are suitably fixed to the movable machine part M and the stationary machine part F (shown schematically in FIG. 1A). As a second essential component, the line guide apparatus 10 has a plurality of annularly closed guide bodies 14 succeeding one another in the longitudinal direction of the carrying strand 11 (FIG. 1B). The guide bodies 14 are arranged in a row one after the other on the carrying cable 11 and are carried and held thereby. The carrying cable 11 thereby carries at least the entire weight of all the guide bodies 14.

As FIG. 1B shows, the loop 13 between the longitudinal portions 12A, 12B forms a relatively small radius, i.e. the longitudinal portions 12A, 12B can extend at a slight horizontal spacing relative to one another. The small radius is possible inter alia by virtue of the fact that adjacent guide bodies 14 can be angled sharply relative to one another. The guide bodies 14 are in each case movable spatially relative to one another, as shown in FIG. 1B. The spacing between the longitudinal portions 12A, 12B may, however, also be greater depending on the particular application and the longitudinal portions 12A, 12B do not have to hang down vertically. Depending on application, the line guide apparatus 10 may extend differently.

FIG. 1C is a schematic representation of a deflection roller U, about which the line guide apparatus 10 is deflected. Depending on the weight load, for example the length of a freely suspended portion 12A, considerable radial forces may here act on the guide bodies 14 in the direction of radius R thereof.

Figure 2B:
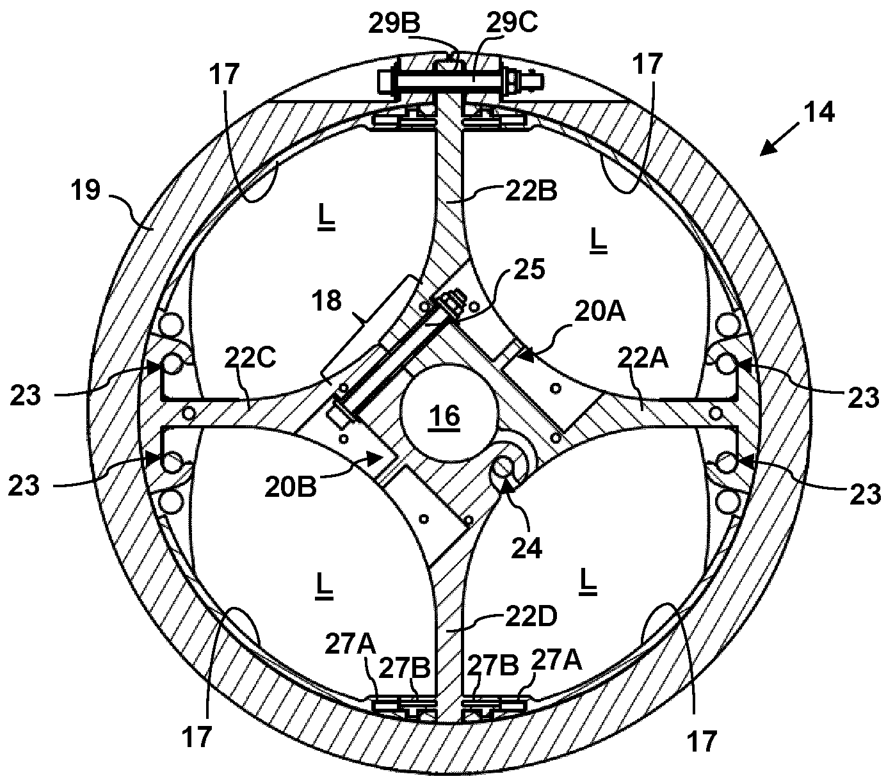

FIGS. 2A-2B show a first exemplary embodiment of a guide body 14 for the line guide apparatus 10, which is further developed to absorb high radial forces. Each guide body 14 has inwardly a central member or central part 15A having a central axis A and a passage opening 16 coaxial therewith for passage of the carrying strand 11 (FIG. 1A) and outwardly an outer part 15B, here with a total of four circumferential elements 17 each in the shape of an arc of a circle, here with an arc length of about 90°, in order to hold the lines (not shown). Each circumferential element 17 to this end radially outwardly delimits a receiving region L open in the axial direction for one or more lines.

The central part 15A comprises a fastening device 18 for axially stationarily fastening the guide body 14 to the suspension cable 11 (cf. FIG. 2A). This is embodied in FIGS. 2A-2D as a screw clamping device 18 in the manner of an articulated clamping shell.

For this purpose, the central part 15A has two one-piece components 20A, 20B produced in one piece from plastics and which each have an inner clamping shell 21A, 21B. By virtue of their conjugate configuration, the clamping shells 21A, 21B form at one side a hinge-like joint 24 (see FIG. 2B) which swivelably connects the clamping shells 21A, 21B. At the opposite side, the clamping shells 21A, 21B have through screw openings for a clamping screw 25 to clamp the internally effectively U-shaped clamping shells 21A, 21B against each other. Other fastenings 18, e.g. quick-release clamping devices or the like, can alternatively also be considered. The clamping shells 21A, 21B further form centrally two approximately semi-cylindrical inner surfaces of the through opening 16. As a result of tightening the clamping shells 21A, 21B, the central part 15A, i.e. the guide body 14, is fastened to the carrying cable 11 since the inner surface of the passage opening 16 is fixed in force-locking relationship to the carrying strand 11. Profiling extending transversely of the central axis A, e.g. a clamping tooth arrangement or the like, is provided on the inner surfaces of the two clamping shells 21A, 21B for better axial securing.

Figure 2C:
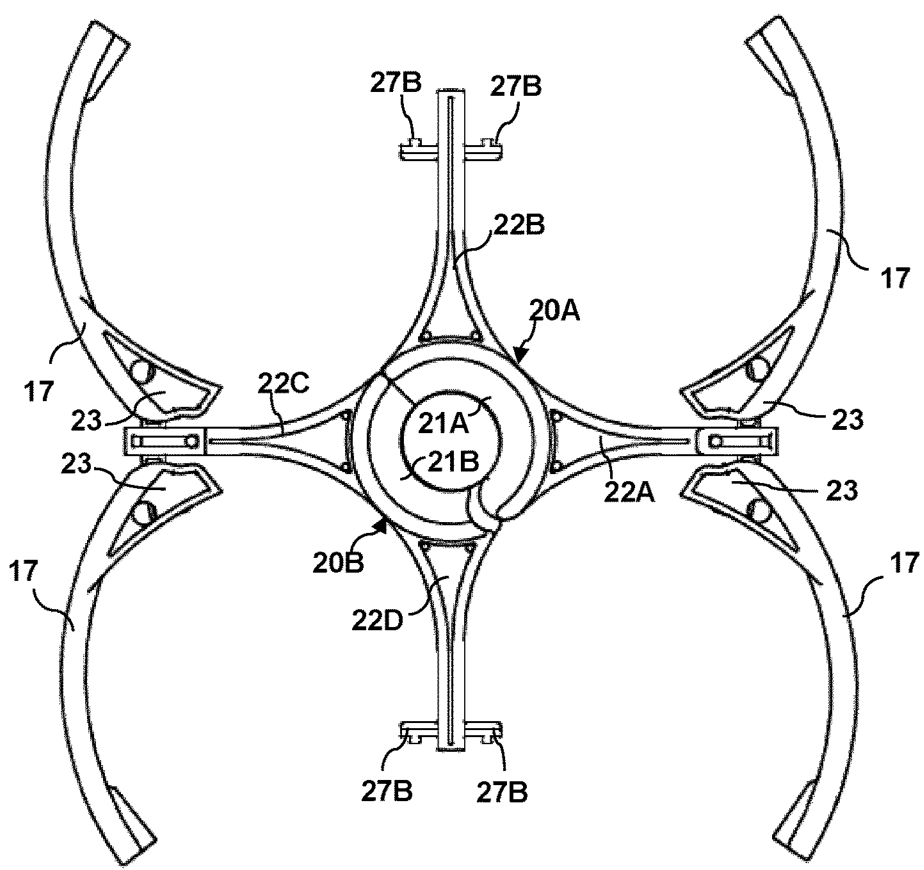
FIGS. 2C-2D: show a partial representation in front view of a completely open guide body (FIG. 2C) according to FIGS. 2A-2B and a partial representation of the central part thereof in front view (FIG. 2D)
Figure 2D:
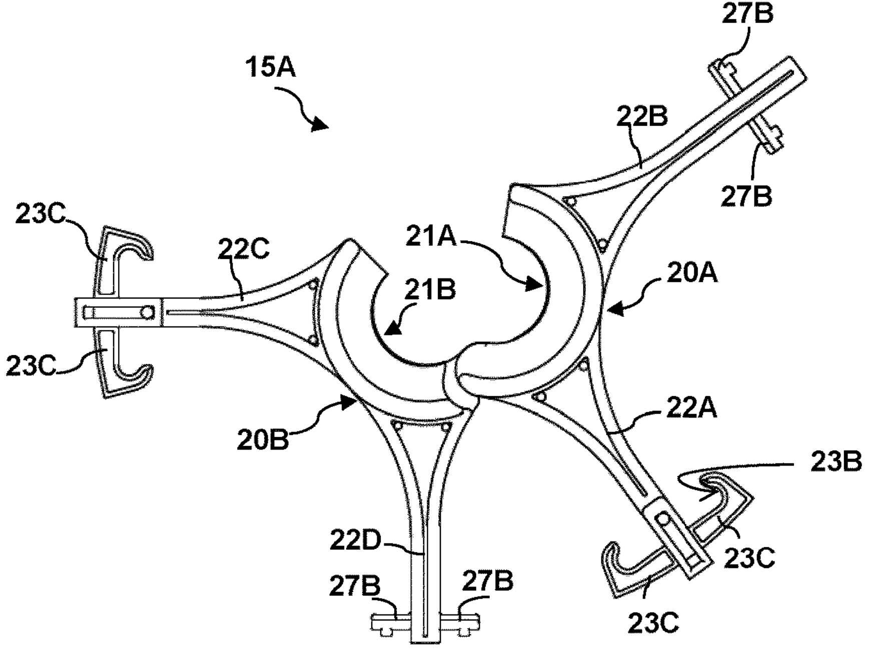

As FIGS. 2B-2D show, each of the two components 20A, 20B in each case further comprises, in one piece with the respective clamping shell 21A, 21B, two radial bars 22A, 22B and 22C, 22D respectively. According to FIGS. 2A-2D, the central region or central part 15A thus comprises a total of four radial bars 22A, 22B, 22C, 22D, which are evenly distributed in the circumferential direction with an angular spacing of around 90°. FIG. 2D only shows the inner part 15A, folded open using the joint 24, without outer part 15B or circumferential elements 17, the degree of opening being sufficient for lateral mounting on the carrying strand 11.

The outer part 15B is mounted at the radially outer end region of in each case a first type of bar 22A or 22C, which are in each case of identical construction. These first bars 22A or 22C here mount two circumferential elements 17 in articulated manner, here in each case in pairs, by way of an articulated joint 23, in the manner of a hinge-like swivel joint or in the manner of a rotary joint. In this way, the two circumferential elements 17 are in each case connected to the corresponding bar 22A or 22C of the central part 15A swivelably by way of an associated articulated joint 23, for example a hinge, between the closed position in FIG. 2B and an open position in FIG. 2C. This facilitates insertion or removal of lines into or from one of the receiving regions L. The four circumferential elements 17 are here preferably standard parts and embodied in the form of quarter-circle arcs, for example as plastics parts, in particular molded parts produced by injection molding.

At a first end, the circumferential elements 17 form, for the articulated joint 23, axially extending swivel pins 23A or bearing bolts (FIG. 3B) rotatably mounted in a rotary receptacle 23B. The rotary receptacle 23B is provided on a hook-like, approximately tangentially arranged projection 23C, of which two are in each case arranged on both sides on the first type of bar 22A or 22C, as may be seen most clearly from FIG. 3C.

Figures 3A, 3B, 3C, 4A, 4B, 5A, 5B:
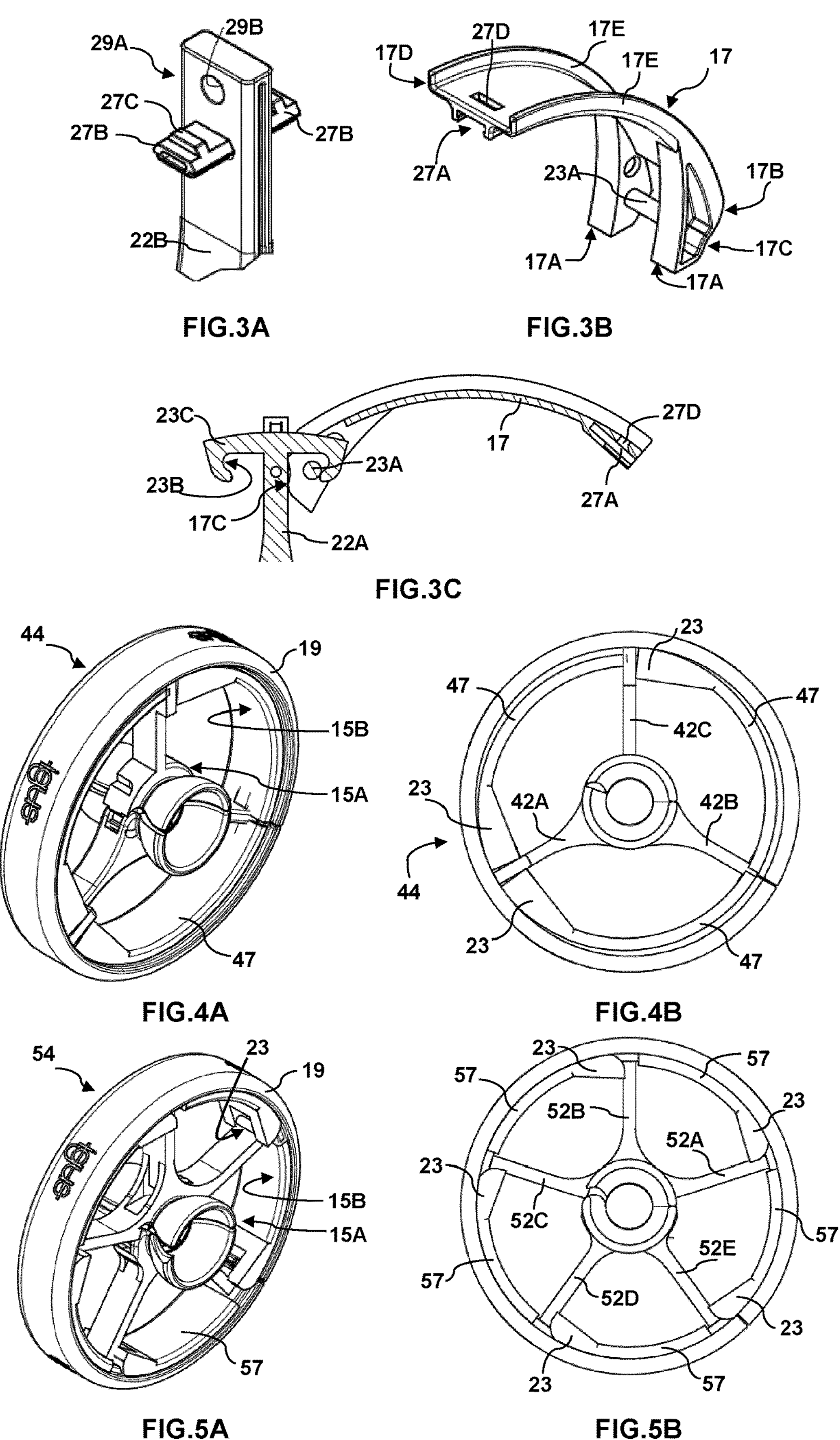
FIGS. 3A-3C: show an end region of a radial bar (FIG. 3A) and an individual circumferential element (FIG. 3B) from FIGS. 2A-2D, in each case in perspective view, and a representation of an articulated joint of the circumferential element (FIG. 3C) in cross-section corresponding to FIG. 2B.
FIGS. 4A-4B: show an alternative exemplary embodiment of a guide body for a line guide apparatus according to FIGS. 1A-1B, here with three radial bars, in perspective view (FIG. 4A) and front view (FIG. 4B)
FIGS. 5A-5B: show a further, preferred exemplary embodiment of a guide body for a line guide apparatus according to FIGS. 1A-1B, here with five radial bars, in perspective view (FIG. 5A) and front view (FIG. 5B)

FIG. 3B further shows, at the first end of the circumferential element 17, two support faces 17A arranged in the axial direction on both sides next to the joint region with the swivel pin 23A, by way of which support faces the first end of the circumferential element 17 is supported on the respective radial bar 22A or 22C with the articulated joint 23 in the circumferential direction and against tilting in the axial direction, when the circumferential element 17 is closed. The support faces 17A here at the same time form the angular abutment of the closed position (FIG. 2B). Radially further to the outside lie two stop faces 17B for delimiting the swiveling-open angle in the fully open position (not in the stop position in FIG. 2C). Between the faces 17A, 17B, the first end of the circumferential element 17 forms a set-back unlocking face 17C, which, in cooperation with the hook-shaped projection 23C on the bar 22A, 22C, allows release of the swivel pin from the hook or the rotary receptacle 23B over only a limited angular range when the snap-fit connection at the second end is released, as shown in FIG. 3C.

The second end of the circumferential element 17 also forms a support face 17D, by way of which the second end is circumferentially supportable against the corresponding radial bar 22B, 22D.

At the second end thereof, the circumferential elements 17 may be fastened to the two further bars 22B, 22D at the radial end regions of these second bars 22B, 22D, which are configured according to a second type, by snap-fit connection in order to close the circumferential elements 17 in the closed swivel position (FIG. 2B). To this end, the second end of the circumferential element 17 forms a latching receptacle 27A, which is latchable to a latching projection 27B of complementary or conjugate configuration on the second type of bar 22B or 22D, in order to secure the circumferential element 17 in the closed position. In this case, the latching receptacle 27A and the latching projection 27B are extended substantially in the tangential direction and configured in such a way that they can be undone by levering out or torsion about a tangential direction, but are not readily undone by purely radial forces. Furthermore, a securing projection 27C is provided on the latching projection 27B, which engages in a recess 27D at the second end of the circumferential element 17 in order to bring about securing in the circumferential direction.

FIGS. 2A-2C further show an annular resilient buffer 19 comprising an elastomer, which surrounds the circumferential elements 17 substantially over the full circumference. The buffer 19 can be rounded in cross-section or at the axial ends and toward the circumferential surface and serves on the one hand as an angular abutment for limiting the minimum deflection radius of the loop 13 (FIG. 1B) and on the other hand for damping radial shocks, for example on impact against the installation/machine or during transportation. The buffer 19 is held securely in the axial direction against the circumferential elements by having one or more projections on the inside (FIG. 2A) which engage in an annular recess on the outside of the circumferential elements 17. To this end, the circumferential elements 17 have a radially protruding edge 17E on both axial end faces to hold the buffer 19, as shown in FIG. 3C.

FIG. 3C further shows a radially protruding securing region 29A on the bar 22B, with a through screw opening 29B for a securing screw 29C with safety nut or the like to close the buffer 19 in captive manner and fasten it to the central part 15A. In this way, the circumferential elements 17 are simultaneously secured captively by the buffer to the central part 15A, cf. FIG. 2B, independently of the articulated joints 23 and the snap-fit connection 27A, 27B. The radial dimension of the bar 22B is accordingly larger by the dimension of the protruding securing region 29A than in the case of the bar 22D, which is otherwise identically embodied and in particular has latching projections 27B on both sides as in FIG. 3A, cf. FIG. 2B.

The internal diameter measured radially between the circumferential elements 17 is here greater than 350 mm, for example in the region of 400 mm.

Each buffer 19 is in the form of an open ring with a gap for mounting on the bar 22B and is closed with the securing screw 29. In the example shown here, the buffer 19 does not protrude axially beyond the circumferential elements 17 but is instead axially flush with the axial end of the circumferential elements 17; a protruding configuration is, however, possible. The resiliently shock-absorbing buffers 19 may be solid bodies or preferably, to save weight, also be embodied as profile bodies, as shown in FIG. 2A, or as hollow bodies.

FIG. 2A further shows two central axially projecting joint regions 26A, 26B of the central part 15A. They serve for defined low-wear relative movement of adjacent guide bodies 14 without transverse shifts relative to one another out of the extended position in the length portions 12A, 12B into the complete, angled position at the apex of the loop 13 (at the bottom in FIG. 1B) and back. To this end, each central part 15A has two joint regions 26A, 26B in opposite relationship at the ends, coaxially with the central axis A. The opposite joint regions 26A, 26B are of such a conjugate or paired embodiment that the one joint region 26A can be axially inserted releasably coaxially into the respective conjugate other joint region 26B of an adjacent guide body with the application of little or no force, in particular without needing a tool, and does not transmit any tensile forces in axial direction A. The construction of the joint regions 26A, 26B corresponds per se to the teaching of WO 2019/243377 A1.

FIGS. 4A-4B show an alternative exemplary embodiment of a guide body 44 for a line guide apparatus according to FIGS. 1A-1B. The guide body 44 has precisely three radial bars 42A, 42B, 42C. The radial bar 42A forms two articulated joints with the circumferential elements 47 mounted thereon, as in the case of the bar 22A in FIG. 2A to FIG. 3C. The radial bar 42A forms two snap-fit connections at its two ends with the circumferential elements 47 mounted thereon. The radial bar 42C, on the other hand, has an articulated joint at one end and at the other end a snap-fit connection with the adjoining circumferential elements 47. The circumferential elements 47 in this case have a radian measure of around 120° and may otherwise, in particular with regard to the articulated joint and snap-fit connection, correspond to the construction of FIG. 2A to FIG. 3C. The further features of the guide body 44 also correspond to the first exemplary embodiment, two radial bars 42A, 42B being provided on one of the components of the central part 15A and just one radial bar 42C being provided in one piece on the other component.

FIGS. 5A-5B show an alternative exemplary embodiment of a guide body 54 for a line guide apparatus according to FIGS. 1A-1B. The guide body 54 has precisely five radial bars 52A, 52B, 52C, 52D, 52E. Each radial bar 52A-52E here has at its radial end region on the one hand a projection for the articulated joint 23 corresponding to FIG. 3C and on the other hand a latching projection for snap-fit connection with a corresponding latching receptacle corresponding to FIGS. 3A-3B. In FIGS. 5A-5B, the circumferential elements 57 have a radian measure of around 70° and are otherwise, in particular with regard to the articulated joint and snap-fit connection, embodied in accordance with the construction of FIG. 2A to FIG. 3C. The further features of the guide body 54 also correspond to the first exemplary embodiment of FIGS. 2A-2D, three radial bars 52A, 52B and 52C here being provided on one of the components of the central part 15A and two radial bars 52D, 52E being provided in one piece on the other.

Figures 6A, 7A, 7B, 7C, 7D:
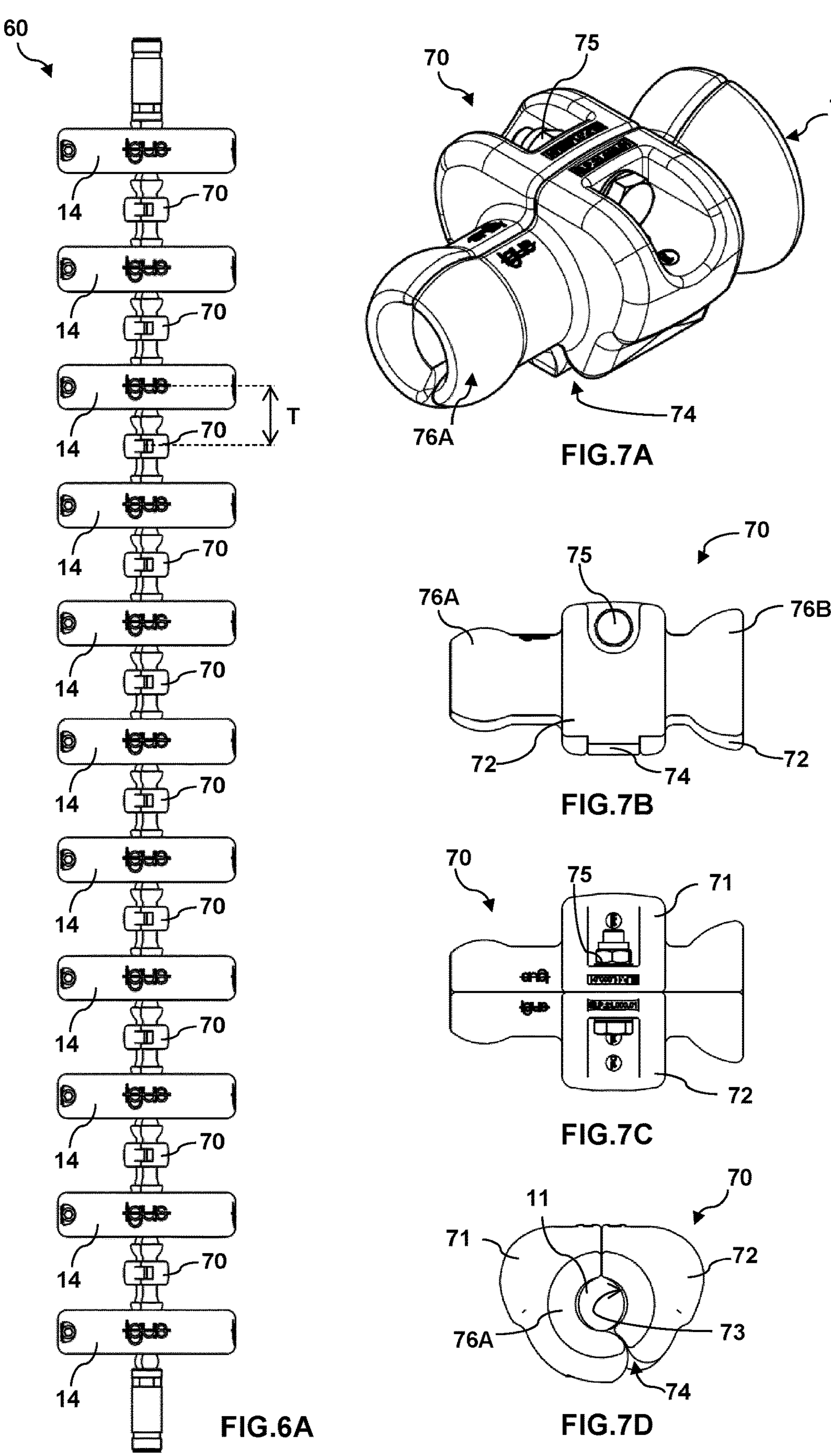
FIGS. 6A-6B: show a preferred exemplary embodiment of a line guide apparatus according to an independent second aspect of the invention in side view of the extended position (FIG. 6A) and a piecewise side view of the deflection region with reduced bending radius (FIG. 6B)
FIGS. 7A-7D: show a preferred exemplary embodiment of a spacer body for a line guide apparatus in particular according to the second aspect of the invention, in perspective view (FIG. 7A), in plan and side view (FIGS. 7B-7C) and in front view (FIG. 7D).

An independent second aspect of the invention is now explained with reference to FIGS. 6-7. FIGS. 6A-6B show an exemplary embodiment of a line guide apparatus 60. The line guide apparatus 60 is depicted in FIG. 6A merely for exemplary illustration in the extended position and shortened with regard to practical applications.

Figure 6B:
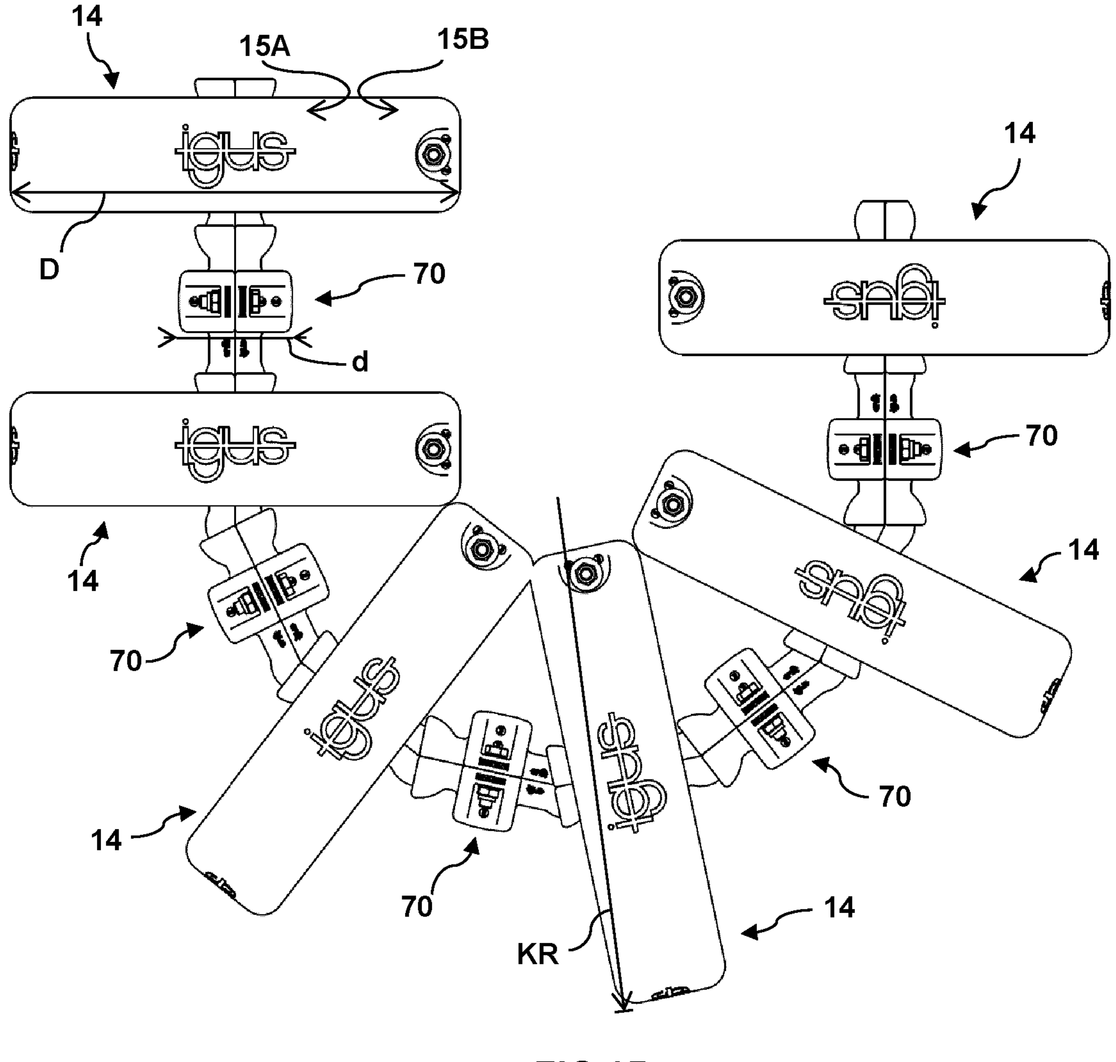

The line guide apparatus 60 for example allows, relative to FIG. 1C, a markedly reduced radius of curvature or bending radius KR, cf. FIG. 6B compared with the construction known for example from WO 2019/243377 A1.

To this end, in each case at least one spacer body 70 is provided between in each case two guide bodies 14 on the carrying strand, not shown here, cf. FIG. 1A, in the longitudinal portion to be deflected (FIG. 6B) or over the entire length of the line guide apparatus 60. The spacer body 70 ensures axial spacing between the central parts 15A (cf. FIGS. 2A-2D or FIGS. 4-5) of two guide bodies 14. The guide bodies 14 may in this case have a per se known construction with central part 15A and outer part 15B, for example a construction from WO 2019/243377 A1 or indeed according to appended FIGS. 2A-2D or FIGS. 4-5, and are therefore not described in any greater detail.

In contrast to FIGS. 1-5, the line guide apparatus 60 thus does not consist of identical bodies or links, but rather has two different bodies or links as the main component parts in addition to the carrying strand 11 (FIG. 1A).

As FIGS. 7A-7D illustrate, however, the spacer bodies 70 are configured differently from the guide bodies 14 and have a considerably reduced external diameter compared to the guide bodies 14. The spacer bodies 70 in particular do not have any outer part 15B comparable with guide bodies 14 and do not serve to guide or radially hold lines. In the present example, the spacer bodies 70 do not have any parts protruding radially through the receiving space L, such that the outer parts 15B of two guide bodies 14 held spaced by the spacer body 70 can rest directly against one another in a fully deflected relative position, as shown in FIG. 6B. This enables a markedly smaller bending radius, also in the case of guide bodies 14 with large dimensions in terms of external diameter and/or in the axial direction of the outer part 15B.

In the example of FIGS. 6A-6B, every second link-like body of the line guide apparatus 60, when viewed along the carrying cable, is a guide body 14 and alternating therewith every second body is a spacer body 70, but other arrangements also fall within the scope of the invention, for example with two spacer bodies 70 between every two guide bodies 14.

As revealed by a comparison of the cross-section or front view of FIG. 7D with for example FIG. 2B, the spacer bodies 70 have a compactly configured outer contour in cross-section perpendicular to the longitudinal direction. This is intended to lie substantially within the radially inner boundary, defined by the central part 15A of the guide bodies 14, of the receiving region L (cf. for example FIG. 2B) for the lines.

The spacer bodies 70 connect two adjacent bodies, i.e. guide bodies 14 or spacer bodies 70, in a spatially deflectable and articulated manner. To this end, the spacer body has two joint regions 76A, 76B at opposite ends, which are embodied to correspond with corresponding joint regions 26A, 26B (cf. FIG. 2A) of the central parts 15A of the guide bodies 14. The construction of the joint regions 26A, 26B or 76A, 76B corresponds per se for example to the teaching of WO 2019/243377 A1 and may inter alia enable an axially releasable, ball joint-like connection, here with joint head 26A, 76A and joint receptacle 26B, 76B. The spacer bodies 70 are dimensioned in such a way in the axial direction that a constantly uniform chain pitch T is achieved over the length.

The maximum external diameter d of the spacer bodies 70 is preferably less than 30% of the external diameter D of the outer parts 15B of the guide bodies 14 and preferably no greater than the delimited internal diameter of the receiving region L. The external diameter of the outer parts 15B may in particular be greater than ≥2.8 times the chain pitch T, the spacer bodies 70 nevertheless enabling a very small bending radius KR, for example of less than 150% of the external diameter of the outer parts 15B, as shown in FIG. 6B.

The spacer bodies 70 consist of two elongate half shell-like components 71, 72, which in the fitted state form an axial passage opening 73 for the carrying strand. For form- and/or force-locking fastening to the carrying strand 11, the spacer body 70 is embodied in the manner of an articulated clamping shell. Components 71, 72 form a clamping joint 74, in the form of a hinge with axis parallel to the longitudinal direction, which clamps the two shell-like components 71, 72 by way of a diametrically opposing clamping screw 75, with generation of a clamping force radially against the carrying strand 11 (cf. FIGS. 7B-7D). Components 71, 72 have an interfering edge-free outer contour and are embodied without radially protruding bars.

What is claimed is:

1. A line guide apparatus for guiding a plurality of lines, comprising:
- a flexible carrying strand of high tensile strength; and
- a number of guide bodies arranged on the carrying strand in the longitudinal direction thereof, adjacent guide bodies being spatially deflectable relative to one another;
- at least some guide bodies in each case having
  - a central part with a fastening device for fastening to the carrying strand; and
  - an outer part with at least one circumferential element, which outwardly delimits a receiving region for lines;
  - at least three radial bars being provided on the central part and holding the outer part, wherein the at least one circumferential element is connected releasably with at least one of the radial bars;
- each circumferential element having a first end which is connected swivelably by an articulated joint to a radial bar, and which has a joint region with a swivel pin which is connected swivelably with a swivel receptacle on the radial bar;
- each circumferential element having a second end which is latchable by a releasable snap-fit connection to a further radial bar and forming a latching receptacle which is latchable with a complementarily configured latching projection on the further radial bar, the latching projection projecting from the radial bar in the circumferential direction or a tangential direction thereto.

2. The line guide apparatus according to claim 1, wherein the latching projection is configured to be in one piece with a radial portion of the radial bar.

3. The line guide apparatus according to claim 2, wherein the circumferential element is configured for support in the circumferential direction with the second end on the corresponding radial bar.

4. The line guide apparatus according to claim 1, wherein:
- at least four radial bars are provided on the central part and carry or support the outer part; or
- at least five radial bars are provided on the central part and carry or support the outer part.

5. The line guide apparatus according to claim 1, wherein:
- the central part forms an axial passage opening for the carrying strand.

6. The line guide apparatus according to claim 5, wherein:
- the flexible carrying strand is embodied as a cable; and
- the fastening device of the central part is embodied in the manner of an articulated clamping shell, and comprises a joint and a clamping screw for fastening the at least two or precisely two components, to the carrying strand or cable with generation of a clamping force.

7. The line guide apparatus according to claim 1, wherein:
- the outer part surrounds the central part in closed manner.

8. The line guide apparatus according to claim 1, wherein a number of the circumferential elements corresponding to the number of radial bars is provided, each circumferential element being connected releasably with in each case two radial bars.

9. The line guide apparatus according to claim 8, wherein each radial bar comprises a radially extending portion and at least one latching projection extending in the circumferential direction for releasable connection with in each case one circumferential element, the at least one latching projection having a latching element for latching engagement with the circumferential element.

10. The line guide apparatus according to claim 9, wherein:
- the first end of the circumferential element forms two support faces in the axial direction on both sides next to the joint region, by way of which support faces the first end is supportable on the radial bar in the circumferential direction; and/or
- the second end of the circumferential element has a support face, by way of which the second end is circumferentially supportable on the radial bar; and/or
- the latching receptacle and the latching projection extend substantially in the tangential direction and/or are releasable by leverage or torsion about a tangential direction.

11. The line guide apparatus according to claim 10, wherein the first end of the circumferential element forms an unlocking face which, in cooperation with the bar, enables release of the swivel pin only over a limited angular range.

12. The line guide apparatus according to claim 10, wherein:

at least one first radial bar is connected articulatedly in each case on both sides with in each case a first end of two circumferential elements, and for this purpose has two swivel receptacles each for one circumferential element;

at least one second radial bar being latchable in each case on both sides by a snap-fit connection with in each case a second end of two circumferential elements, and to this end having two circumferentially extending, one-piece latching projections with in each case one latching element each for one circumferential element.

13. The line guide apparatus according to claim 1, wherein the outer part comprises at least two circumferential elements and a circumferential, annular, resilient buffer for shock-absorption, which surrounds the circumferential elements externally and is held on the circumferential elements in the axial direction.

14. The line guide apparatus according to claim 13, wherein the circumferential elements have on the outside, and the buffer on the inside, a shape with an annular recess and engaging projection to hold the buffer in the axial direction.

15. The line guide apparatus according to claim 13, wherein one of the at least three radial bars has a radially protruding securing region to which the annular resilient buffer is fastenable.

16. The line guide apparatus according to claim 1, wherein:

each radial bar is embodied in one piece and/or each circumferential element is embodied between two circumferentially successive bars as a continuous arc segment and held at the end on these bars; and/or the radial bars are arranged uniformly distributed in the circumferential direction around a center axis and/or each circumferential element is embodied in the form of an arc of a circle and has a radian measure in the circumferential direction of ≤120; and/or the internal diameter of the outer part amounts to ≥300 mm; and/or the outer part of the guide body is embodied to be mirror-symmetrical relative to a plane which extends perpendicular to the longitudinal direction.

17. A guide body for a line guide apparatus according to claim 1, comprising:

a central part with a fastening device for fastening to a carrying strand, and an outer part with at least one circumferential element extending in a circumferential direction, which outwardly delimits a receiving region for lines;

at least three radial bars being provided on the central part and holding the outer part and the at least one circumferential element being connected releasably with at least one of the radial bars, wherein:

each circumferential element has a first end which is connected swivelably by an articulated joint to a radial bar, and which has a joint region with a swivel pin which is connected swivelably with a swivel receptacle on the radial bar;

each circumferential element having a second end which is latchable by a releasable snap-fit connection to a further radial bar and forming a latching receptacle which is latchable with a complementarily configured latching projection on the further radial bar, the latching projection projecting from the radial bar in the circumferential direction or a tangential direction thereto.

18. The guide body according to claim 17, wherein, in the operational state of the guide body, the outer part forms a ring around the central part, which ring is passed through or supplemented by radial end regions of the bars.

19. The line guide apparatus according to claim 1, wherein the carrying strand extends over a length of the line guide apparatus.

20. The line guide apparatus according to claim 5, wherein the central part has at least two or precisely two components for fastening to the carrying strand, the components being configured for form- and/or force-locking fastening to the carrying strand and delimiting the passage opening.

21. The line guide apparatus according to claim 20, wherein the components are clamping shells, for fastening to the carrying strand.

22. The line guide apparatus according to claim 7, wherein the outer part has at least one closure, in order to close the receiving region transversely of the longitudinal direction.

23. The line guide apparatus according to claim 13, wherein the at least two circumferential elements are held releasably, movably and/or swivelably on the central part.

* * * * *